United States Patent
Dong et al.

(10) Patent No.: US 8,410,642 B2
(45) Date of Patent: *Apr. 2, 2013

(54) FLAT LINEAR VIBRATOR

(75) Inventors: Le-Ping Dong, Shenzhen (CN); Hong-Fu Xu, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 302 days.

This patent is subject to a terminal disclaimer.

(21) Appl. No.: 12/774,890

(22) Filed: May 6, 2010

(65) Prior Publication Data
US 2011/0115310 A1    May 19, 2011

(30) Foreign Application Priority Data

Nov. 16, 2009 (CN) .................. 2009 2 0260392 U

(51) Int. Cl.
*H02K 33/16* (2006.01)
(52) U.S. Cl. .......................... 310/25; 310/28
(58) Field of Classification Search .......... 310/15, 310/17, 20–30, 81; 381/396, 400, 401, 404, 381/406, 412; 340/388.1
See application file for complete search history.

(56) References Cited

U.S. PATENT DOCUMENTS

| 3,312,841 | A  | * | 4/1967  | Makino ........................... 310/15 |
| 7,550,880 | B1 | * | 6/2009  | Pusl ............................... 310/15 |
| 2008/0306332 | A1 | * | 12/2008 | Choi et al. ...................... 600/38 |
| 2009/0096299 | A1 | * | 4/2009  | Ota et al. ....................... 310/25 |
| 2011/0089772 | A1 | * | 4/2011  | Dong et al. ..................... 310/25 |
| 2011/0115311 | A1 | * | 5/2011  | Dong et al. ..................... 310/28 |

* cited by examiner

*Primary Examiner* — Tran Nguyen
(74) *Attorney, Agent, or Firm* — IPro, Inc.; Na Xu

(57) ABSTRACT

A linear vibrator is disclosed. The linear vibrator includes a housing having a base and a cover, a number of elastic members connected to the housing, a vibrating unit suspended in the housing by the elastic members, and a coil positioned in the housing. The base has a bottom wall and a plurality of sidewalls extending vertically from the bottom wall. The vibrating unit has a magnet assembly and vibrates along a direction parallel to the bottom wall. The base further has a block located on the bottom wall. The block is located on a vibration path of the weight contacting the weight during vibration. An effective elastic displacement of the elastic member is not smaller than a distance between the block and a part contacting the block of the weight.

12 Claims, 2 Drawing Sheets

FLAT LINEAR VIBRATOR

FIELD OF THE INVENTION

The present invention generally relates to the art of vibrators and, more particularly, to a flat linear vibrator for generating tactile sensation.

DESCRIPTION OF RELATED ART

Consumer products, such as mobile phones and portable multi-media players, generally include vibrators for generating tactile feedback. For example, a mobile phone has a vibrator for generating vibration while a call is called in, and a portable multi-media player has a touch screen having vibrators for getting tactile feedback.

A vibrator has a moving unit moving along a linear direction is called linear vibrator. Linear vibrators are widely used in consumer products and are disclosed in U.S. Pat. No. 6,466,682 B2 issued on Oct. 15, 2002, and U.S. Pat. No. 7,099,489 B2 issued on Aug. 29, 2006. The vibrator is mounted on a mounting surface of a printed circuit board, and the moving unit thereof is actuated to move along a direction perpendicular to the mounting surface. However, the movement along the direction perpendicular to the mounting surface increases the height of the vibrator.

So, it is necessary to provide a new vibrator for solving the problem mentioned above.

SUMMARY OF THE INVENTION

In one embodiment of the present invention, a linear vibrator is disclosed. The linear vibrator includes a housing having a base and a cover, a number of elastic members connected to the housing, a vibrating unit suspended in the housing by the elastic members, and a coil positioned in the housing. The base has a bottom wall and a plurality of sidewalls extending vertically from the bottom wall. The vibrating unit has a magnet assembly and vibrates along a direction parallel to the bottom wall. The base defines a pair of blocks for limiting the vibration amplitude of the vibrating unit.

Other features and advantages of the present invention will become more apparent to those skilled in the art upon examination of the following drawings and detailed description of the exemplary embodiment.

DETAILED DESCRIPTION OF THE EXEMPLARY EMBODIMENT

Reference will now be made to describe an exemplary embodiment of the present invention in detail.

Figure 1:
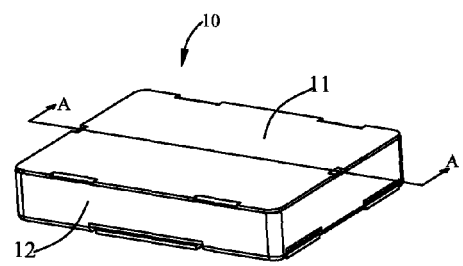
FIG. 1 is an isometric view of a linear vibrator in accordance with an embodiment of the present invention.
Figure 2:
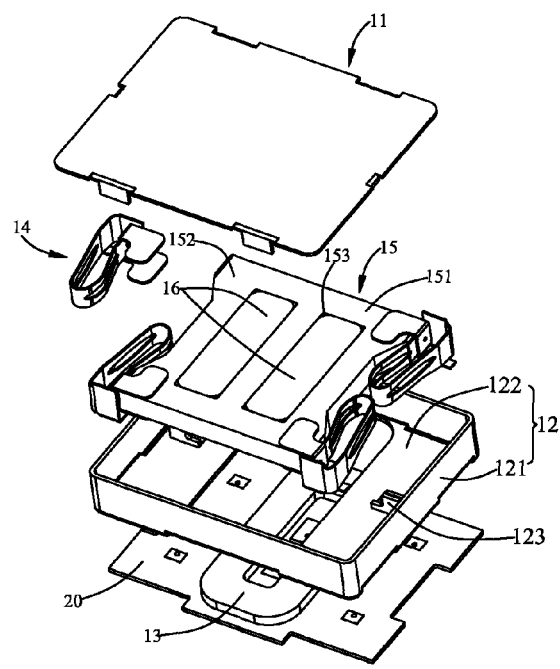
FIG. 2 is an exploded view of the linear vibrator in FIG. 1.
Figure 3:
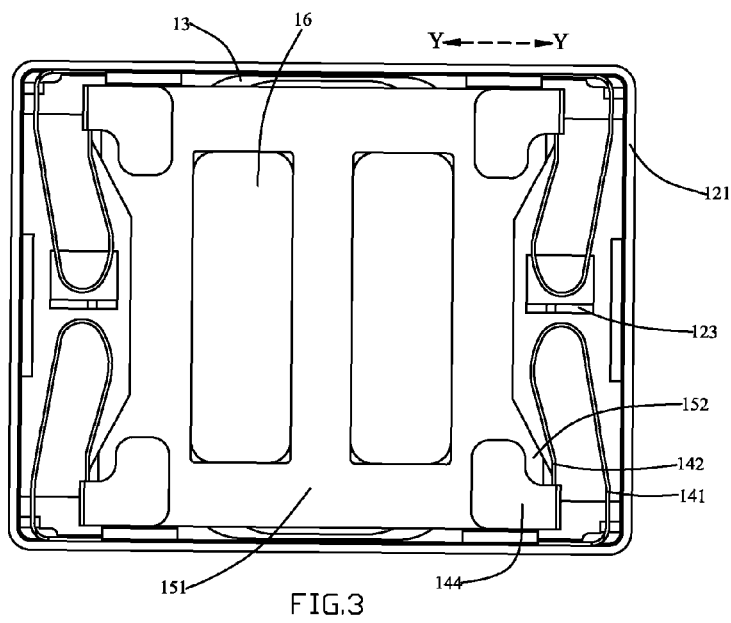
FIG. 3 is top view of the linear vibrator, a cover thereof being removed away.

A linear vibrator is mounted on a printed circuit board for generating tactile vibration. Referring to FIGS. 1-3, a linear vibrator 10, in accordance with an embodiment of the present invention, includes a cover 11, a base 12 forming a receiving space together with the cover 11, an annular coil 13, a plurality of elastic member 14, a weight 15, and a magnet assembly 16. The cover 11 and the base 12 corporately form a housing having the receiving space. The base 12 further defines a bottom wall 122 and a plurality of sidewalls 121 extending vertically from the bottom wall 122. When the vibrator 10 is mounted on the printed circuit board 20, the bottom wall 122 is attached and parallel to the printed circuit board 20.

The coil 13 is positioned on the bottom wall 122 and a pair of leads thereof is electrically connected to electrical pads embedded in the bottom wall 122 for receiving current from external circuits. The elastic members 14 are positioned on the base 12, preferably on the sidewalls 121 of the base 12. The weight 15 is suspended in the receiving space by the elastic members 14. The weight 15 includes a main body 151 and a plurality of positioning portions 152 extending from the main body 151. The positioning portions 152 are used for assembling with the elastic members 14. The main body 151 defines a through hole 153 in a middle portion thereof for receiving the magnet assembly 16 therein. Thus, the magnet assembly 16, together with the weight 15, is suspended in the receiving space by the elastic members 14. In fact, the magnet assembly 16 may be solely served as a vibrating unit, and may be directly connected to the elastic members 14. In addition, if used, the weight 15 can be made from materials having densities higher than 7.8 g/cm$^3$. The base 12 further defines a block 123 located on the bottom wall 122. The block 123 is located on a vibration path of the vibrating unit in order to contact the vibrating unit for limiting the vibration amplitude of the vibrating unit during vibration. When the vibrating unit is still, an effective elastic displacement of the elastic member 14 is not smaller than a distance between the block 123 and a part of the vibrating unit contacting the block 123. The so-called effective elastic displacement is defined as a maximum elastic deformation of the elastic arm 142 along the vibrating direction of the vibrating unit.

Figure 4:
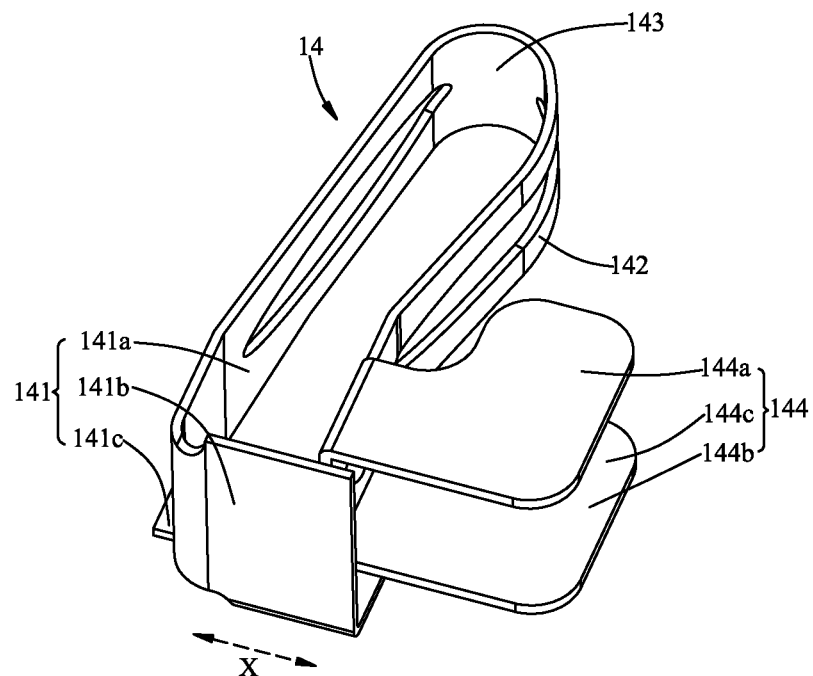
FIG. 4 is an isometric view of an elastic member of the linear vibrator.
Figure 5:
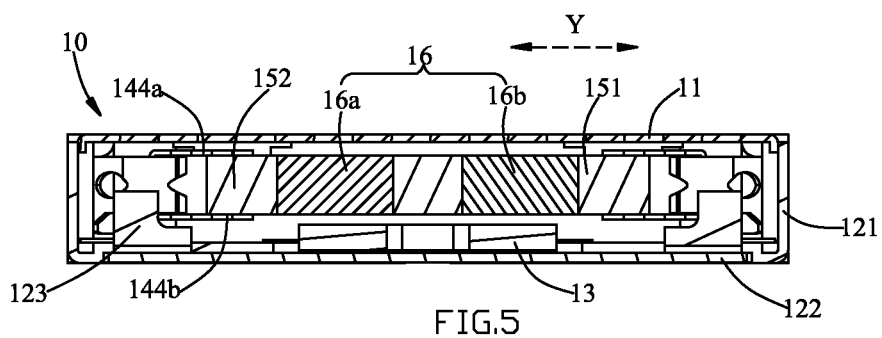
FIG. 5 is a cross-sectional view of the linear vibrator along a line A-A in FIG. 1.
Figure 6:
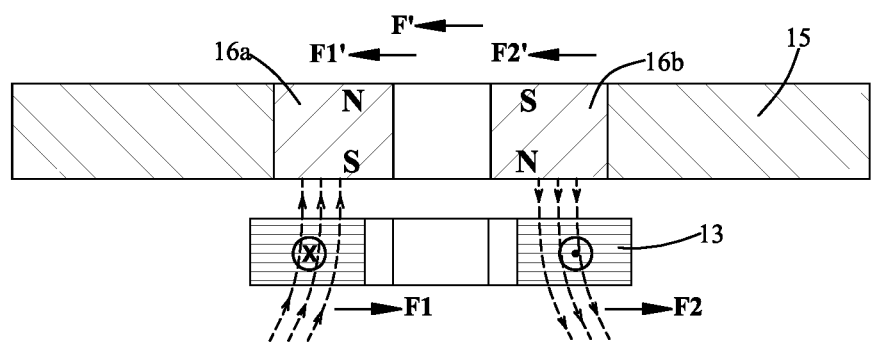
FIG. 6 is a schematic illustration showing how the vibrator woks.

Referring to FIGS. 4-5, together with FIGS. 1-3, each of the elastic members 14 includes a fastening portion 141 fixed on the sidewall 121, an elastic arm 142 substantially parallel to the fastening portion 141, and a mounting portion 144 extending from the elastic arm 142. The fastening portion 141 is connected to the elastic arm 142 by a U-shape connecting portion 143. Preferably, the fastening portion 141 may include a first fastening part 141a and a second fastening part 141b substantially perpendicularly to the first fastening part 141a, by which the fastening portion 141 can be positioned on two adjacent sidewalls 121 of the base 12. In order to fast the elastic members 14 stably and firmly, the fastening portion 141 further comprises a third fastening part 141c extending from the first fastening part 141a and located on the bottom wall 122. The mounting portion 144 extends vertically from the elastic arm and extends far away from the fastening portion 141. Further, preferably, the mounting portion 144 may include an upper part 144a, a lower part 144b opposed from the upper part 144b, and a slot 144c between the upper part 144a and the lower part 144b. Accordingly, the elastic arm 142 can deform elastically along a direction X-X substantially perpendicularly to the first fastening part 141a. The positioning portion 152 of the weight 15 is at least partially received in the slot 144c of the mounting portion 144 of the elastic member 14, i.e., the positioning portion 152 is sandwiched between the upper part 144a and the lower part 144b. Therefore, the weight 15 is suspended in the receiving space by the elastic members 14.

The magnet assembly 16 in the through hole 153 has two halves, in which, one half 16a has magnetic poles opposite to those of the other half 16b, as shown in FIG. 5. Planes of magnetic poles of the magnet assembly 16 are parallel and face to the bottom wall 122 and are also parallel to the coil 13. The magnet assembly 16 is arranged above the coil 13. The coil 13 receives current from external circuit. At one moment, direction of the current passing through the left half of the coil 13 is inward into the paper (labeled as $\otimes$), and direction of the current passing through the right half of the coil 13 is outward (labeled as $\odot$). Magnetic lines of force are shown as dashed lines with arrows. According to Left-hand rule, direction of the electromagnetic force F1 applied on the left half coil 13 is rightward, and direction of the electromagnetic force F2 applied on the right half coil 13 is also rightward. Thus, the whole coil 13 is given a rightward total electromagnetic force which forces the coil 13 to move rightward. However, the coil 13 is positioned on the bottom wall 122 and can't move by the force. As a result, the weight 15 suspended by the elastic members 14 is forced to move leftward by the reaction force F'. As direction and intensity of the current passing through the coil 13 is varied, the movement of the weight 15 is leftward or rightward, alternatively, which is called vibration. Direction of the vibration is parallel to the bottom wall 122.

As the direction of vibration is parallel to the bottom wall, a height of the linear vibrator can be reduced. During vibration, the elastic members 14 is constantly and alternatively compressed and stretched. If the vibration amplitude exceeds the maximum elastic deformation of the elastic members, the elastic members may be damaged. By virtue of the blocks, the elastic members are effectively protected from plastic deformation.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A linear vibrator, comprising:
a cover;
a base forming a housing together with the cover, the base defining a bottom wall and a plurality of sidewalls;
a plurality of elastic members received in the housing, each of the elastic members including a fastening portion connecting to the housing, an elastic arm extending from the fastening portion, and a mounting portion extending from the elastic arm, the elastic arm being deformable parallel to the bottom wall;
a weight suspended in the housing by the elastic members and defining a through hole therein; a magnet assembly accommodated in the through hole of the weight, one half of the magnet assembly having magnetic poles opposite to those of the other half, and planes of magnetic poles of the magnet assembly being parallel and facing to the bottom wall of the base;
and a coil positioned on the bottom wall and located below the magnet, wherein
the base further defines a block located on the bottom wall, and the block is located on a vibration path of the weight for contacting the weight during vibration, and an effective elastic displacement of the elastic member is not smaller than a distance between the block and a part of the weight contacting the block of the weight while the weight is still.

2. The linear vibrator as described in claim 1, wherein the fastening portion of the elastic member includes a first fastening part connecting to one sidewall of the base and a second fastening part connecting to another adjacent sidewall.

3. The linear vibrator as described in claim 1, wherein the mounting portion of the elastic member includes an upper part, a lower part opposed from the upper part, and a slot between the upper part and the lower part.

4. The linear vibrator as described in claim 3, wherein the weight defines a positioning portion at least partially received in the slot and sandwiched between the upper part and the lower part.

5. The linear vibrator as described in claim 1, wherein, the weight is made from materials having densities higher than 7.8 g/cm$^3$.

6. A linear vibrator, comprising:
a housing including a cover and a base, the base defining a bottom wall and a plurality of sidewalls vertically extending from the bottom wall;
a plurality of elastic members connected to the housing, each of the elastic members including an elastic arm being deformable parallel to the bottom wall;
a vibrating unit suspended by the elastic members, the vibrating unit comprising a magnet assembly, one half of the magnet assembly having magnetic poles opposite to those of the other half, and planes of magnetic poles of the magnet assembly being parallel and facing to the bottom wall of the base;
and a coil positioned on the bottom wall and located below the magnet, wherein
the base further defines a block located on the bottom wall, and the block is located on a vibration path of the weight for contacting the weight during vibration, and an effective elastic displacement of the elastic member is not smaller than a distance between the block and a part of the weight contacting the block of the weight while the weight is still.

7. The linear vibrator as described in claim 6, wherein the elastic member further including a fastening portion having a first fastening part connecting to one sidewall of the base and a second fastening part connecting to another adjacent sidewall.

8. The linear vibrator as described in claim 7, wherein the elastic member further defines a mounting portion extending from the elastic arm, the mounting portion including an upper part, a lower part opposed from the upper part, and a slot between the upper part and the lower part.

9. The linear vibrator as described in claim 8, wherein the weight defines a positioning portion at least partially received in the slot and sandwiched between the upper part and the lower part.

10. The linear vibrator as described in claim 6 further comprising a weight which is made from materials having densities higher than 7.8 g/cm$^3$.

11. A linear vibrator, comprising:
a housing including a base and a cover, the base having a bottom wall and a plurality of sidewalls extending vertically from the bottom wall; a plurality of elastic members connected to the housing;
a vibrating unit suspended in the housing by the elastic members, the vibrating unit having a magnet assembly and vibrating along a direction parallel to the bottom wall;
a coil positioned on the bottom wall and facing the magnet assembly, wherein the base further defines a block located on the bottom wall, and the block is located on a vibration path of the vibrating unit for contacting the vibrating unit during vibration, and an effective elastic displacement of the elastic member is not smaller than a distance between the block and a part of the vibrating unit contacting the block of the weight while the vibrating unit is still.

12. The linear vibrator as described in claim 11 further comprising a weight surrounding the magnet assembly, the weight being made from materials having densities higher than 7.8 g/cm$^3$.

* * * * *